Patented Apr. 12, 1949

2,466,681

UNITED STATES PATENT OFFICE 2,466,681

1-CHLORO-2-ACYL-1-CYCLOHEXENES

Herman A. Bruson, Rydal, and Harry R. Raterink, Drexel Hill, Pa., assignors, by mesne assignments, to Rohm & Haas Company, Philadelphia, Pa., a corporation of Delaware No Drawing. Application August 7, 1947, Serial No. 767,324

4 Claims. (Cl. 260—586)

This invention relates to 1-chloro-2-acyl-1-cyclohexenes and to a method for their preparation. These are new compounds which are important intermediates for the preparation of other compounds, including other new compounds. They are particularly useful in the synthesis of diketones and ketonic acids and their esters, which, because of their combination of functional groups, are compatible with various types of resins, thus serving to soften and plasticize them.

According to this invention, a cyclohexanone and an organic carboxylic acid chloride are reacted by condensing them together under the influence of aluminum chloride to form a 1-chloro-2-acyl-1-cyclohexene. The reaction can be formulated as follows:

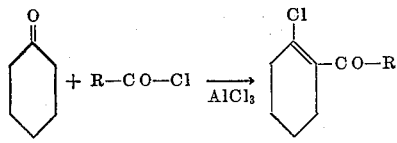

the rings here representing saturated carbocycles except for the indicated double bond. The group R represents a monovalent organic radical free of groups reactive to aluminum chloride.

The reaction is applicable to cyclohexanone itself and to hydrocarbon-substituted cyclohexanones possessing a methylene group, —CH$_2$—, in the cycle in juxtaposition to the carbonyl group thereof. With an unsubstituted methylene group in the ring in the ortho-position to its carbonyl group, there may occur in any of the other positions an alkyl, aralkyl, cycloalkyl, or other hydrocarbon substituent such as methyl, ethyl, isopropyl, tert.-butyl, octyl, isooctyl, tert.-octyl, isononyl, decyl, dodecyl, benzyl, methylbenzyl, butylbenzyl, cyclohexyl, or the like. Substituent groups of one to eight carbon atoms are particularly worthy of being noted in this respect, although other groups may also be used.

The carboxylic acid chlorides employed can be aliphatic, aromatic, arylaliphatic, or cycloaliphatic in character and can possess groups or substituents which are not readily affected by the aluminum chloride such as, for example, nitro, carbalkoxy, alkoxy, aryloxy, chloro, keto, or thio groups. Typical carboxylic acid chlorides which can be used are, for example, the members of the fatty acid series, ranging from acetic to stearic and including the unsaturated members such as crotonic, undecylenic, oleic, and linoleic. Furthermore, aromatic acid chlorides such as benzoyl, methylbenzoyl, nitrobenzoyl, or chlorobenzoyl chlorides can be used. Other acid chlorides which can be employed are, for example, ω-carbethoxy valeryl chloride, ω-acetyl caproyl chloride, phenacetyl chloride, cinnamoyl chloride, naphthenic acid chloride, indolacetyl chloride, phenoxy acetyl chloride, 2,4-dichlorophenoxy acetyl chloride, and homologues thereof.

In carrying out this invention, it has been found advantageous to utilize at least one molecular equivalent each of the acyl chloride and aluminum chloride per mole of the cyclohexanone employed. The yields are in most cases considerably improved however, if approximately two equivalents each of the acyl chloride and aluminum chloride are used for each mole of the cyclohexanone. Inert solvents or suspending media for the reaction such as carbon disulfide or tetrachloroethane can be used to assist the condensation by maintaining a stirrable or fluid condition. Reaction sets in at about 10° C. and is conveniently regulated at 25°–40° C. by the rate of addition of the liquid components to the aluminum chloride suspension or by suitable cooling. When the exothermic reaction has subsided, the mixture may be heated gently to complete the reaction at 50°–60° C. if necessary. The reaction product is then worked by hydrolyzing the mixture with water, ice, or hydrochloric acid, separating the organic product and isolating the desired compound by distillation under reduced pressure.

The following examples illustrate this invention:

Example 1

To a stirred suspension of 534 g. of powdered, anhydrous aluminum chloride and 600 g. of carbon disulfide, there was added dropwise during the course of two and one-quarter hours a mixture of 196 g. of cyclohexanone and 314 g. of acetyl chloride at 30°–42° C. The mixture was stirred for 18 hours at room temperature and then poured into a slurry of 1600 g. of cracked ice and 100 g. of concentrated hydrochloric acid. The oil layer which formed was separated and the aqueous layer extracted with 300 cc. of carbon disulfide. The combined extract and oil layer was washed with 300 cc. of water and the solvent removed by distillation. The residual oil was distilled under reduced pressure to give 223 g. of yellow liquid boiling at 85°–105° C. (8 mm.). Upon redistillation this yielded 210 g. of 1-chloro-2-acetyl-cyclohexene-1

$$\begin{array}{c} \mathrm{Cl} \\ | \\ \mathrm{C} \\ \diagup \quad \diagdown \\ \mathrm{H_2C} \quad \quad \mathrm{C-COCH_3} \\ | \quad \quad \quad || \\ \mathrm{H_2C} \quad \quad \mathrm{CH_2} \\ \diagdown \quad \diagup \\ \mathrm{CH_2} \end{array}$$

boiling at 93°–98° C. (9 mm.). It is a colorless liquid having the following constants:

$N_D^{25}$, 1.4952; $d_4^{25}$, 1.1187; B. P. 96°–97° C. (9 mm.).

Anal. Calcd. for C$_8$H$_{11}$OCl: per cent C, 60.54;

H, 6.99; Cl, 22.36. Found: per cent C, 60.41; H, 7.11; Cl, 22.11.

Upon treatment with concentrated sulfuric acid at 95°–100° C. and subsequent hydrolysis with water, it yields first 2-acetylcyclohexanone and finally ω-acetyl caproic acid.

*Example 2*

To a rapidly stirred mixture of 267 g. of anhydrous aluminum chloride and 300 g. of carbon disulfide there was added dropwise a mixture of 98 g. of cyclohexanone and 282 g. of benzoyl chloride during the course of two and one-half hours while the reaction temperature was maintained at 25°–31° C. by cooling. The mixture was then stirred at room temperature for five hours and poured into a slurry of 1000 g. of chipped ice and 50 g. of concentrated hydrochloric acid. The precipitate of benzoic acid which formed at this point was filtered off and washed with carbon disulfide. The washings were combined with the carbon disulfide layer and the total carbon disulfide layer separated from the water. The water layer was extracted with carbon disulfide and this extract was added to the main fraction, the combined carbon disulfide solutions being then washed with 300 cc. of 5% sodium hydroxide solution. After the carbon disulfide was removed by distillation, the residual oil was distilled under reduced pressure to give 132 g. of product boiling at 128°–136° C. (0.2 mm.) Redistillation yielded 124 g. of 1-chloro-2-benzoyl-cyclohexene-1

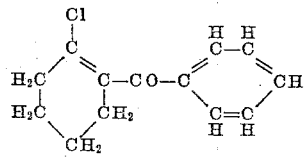

as a pale yellow oil boiling at 121°–128° C. (0.14 mm.). A heart cut boiling at 126° C. (0.14 mm.) possessed the following constants:

$N_D^{25}$, 1.5717; $d_4^{25}$, 1.178

*Example 3*

To a stirred suspension of 267 g. of anhydrous aluminum chloride and 300 g. of carbon disulfide there was gradually added a mixture of 185 g. of propionyl chloride and 98 g. of cyclohexanone at 25°–30° C. during the course of two and one-half hours. After stirring at room temperature for five hours longer the mixture was worked as described in Example 2 to yield 131 g. of crude 1-chloro-2-propionyl-cyclohexene-1 boiling at 111°–121° C. (10–12 mm.) as a pale yellow liquid. Upon redistillation this gave 120 g. of the product

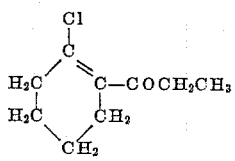

as a colorless liquid boiling at 113°–116° C. (12 mm.). The pure compound possessed the following constants:

$N_D^{20}$, 1.4901; $d_4^{20}$, 1.0931; B. P. 116° C. (12 mm.)

*Example 4*

The procedure described in Example 3 was applied to a mixture consisting of 267 g. of anhydrous aluminum chloride and 300 g. of carbon disulfide, reacting with a mixture of 98 g. of cyclohexanone and 213 g. of n-butyryl chloride. The product, 1-chloro-2-butyryl-cyclohexene-1,

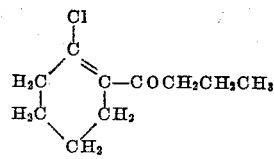

was obtained in a yield of 103 g. of a pale yellow liquid boiling at 123°–133° C. (12 mm.). Redistillation gave 95 g. of the pure compound $N_D^{20}$, 1.4879; $d_4^{20}$, 1.0702; B. P. 126° C. (12 mm.)

*Example 5*

The procedure described in Example 3 was applied to a mixture consisting of 240 g. of anhydrous aluminum chloride and 300 g. of carbon disulfide, reacting with a mixture of 88 g. of cyclohexanone and 293 g. of 2-ethylhexoyl chloride.

The product, 1-chloro-2-(α-ethylhexoyl)-cyclohexene-1

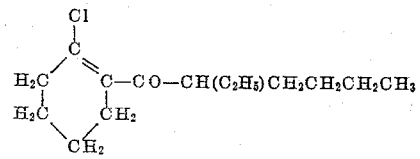

was obtained in a crude yield of 42 g. as a yellow liquid boiling at 136°–176° C. (11 mm.). After two distillations this gave 18 g. of purified product boiling at 135°–140° C. (3 mm.), having the following constants:

$N_D^{20}$, 1.472; $d_4^{20}$, 0.975

*Example 6*

A solution of 209 g. of crotonyl chloride and 98 g. of cyclohexanone was added dropwise during two hours to a stirred suspension of 267 g. of anhydrous aluminum chloride and 300 g. of carbon disulfide while the reaction mixture was cooled to 25°–30° C. by means of an ice-bath. After the mixture had been stirred at room temperature for an additional four hours, it was poured into a slurry of 1000 g. of ice and 50 g. of concentrated hydrochloric acid. The carbon disulfide layer was separated and the water layer extracted twice with 300 cc. portions of carbon disulfide. The combined carbon disulfide extract was washed with 400 cc. of 5% hydrochloric acid, then with 400 cc. of water, twice with 400 cc. of 5% sodium hydroxide solution, and finally with water. After the carbon disulfide was removed, the residual oil, upon vacuum distillation, gave 66 g. of 1-chloro-2-crotonyl-cyclohexene-1

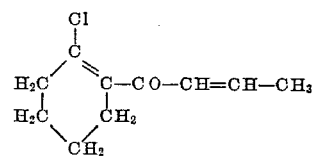

as a yellow liquid boiling at 103°–106° C. (0.27 mm.). Upon redistillation this yielded 53 g. of the purified compound as a pale yellow liquid boiling at 90°–93° C. (0.15 mm.), having the following constants:

$N_D^{20}$, 1.5171; $d_4^{20}$, 1.1098

Per cent chlorine: Found, 19.10; calc., 19.21

*Example 7*

The procedure described in Example 3 was applied to a mixture consisting of 267 g. of anhydrous aluminum chloride and 300 g. of carbon disulfide reacting with 98 g. of cyclohexanone and 385 g. of ω-carbethoxy valeryl chloride.
The product having the formula

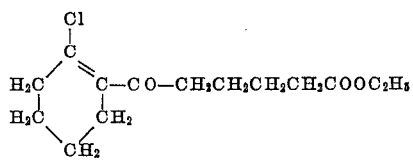

was obtained in a crude yield of 48 g. as a pale yellow liquid boiling at 148°–169° C. (0.08 mm.). The purified compound boiled at 164°–165° C. (0.08 mm.) and had the following constants:

$N_D^{20}$, 1.4882; $d_4^{20}$, 1.1107
Per cent chlorine: Found, 12.97; calcd. 13.00

In the same way there may be used other acyl halides wherein the acyl group is monovalent and free of groups which are reactive to aluminum chloride and similar Friedel-Crafts reagents. The aliphatic monocarboxylic halides of two to eighteen carbon atoms form one class of considerable interest for this reaction. The members of this class react essentially as has been illustrated above with acetyl chloride, propionyl chloride, butyryl chloride, 2-ethylhexoyl chloride, and crotonyl chloride. The acyl halides, R—CO—X, wherein R is an aliphatic group of one to seventeen carbon atoms, and X is chlorine, may be of straight or branched chain structure and may be saturated or unsaturated. A second class of interest is composed of the acyl halides of aromatic acids, particularly those of seven carbon atoms. Here, R in the formula RCOX is a phenyl ring which may be unsubstituted or may be substituted with groups unreactive to aluminum chloride.

We claim:

1. A method for preparing 1-chloro-2-acyl-1-cyclohexenes which comprises condensing an organic carboxylic acid chloride having at least two carbon atoms, and not more than one carbonyl chloride group, in the presence of anhydrous aluminum chloride with a cyclohexanone possessing a free ring methylene group ortho to its carbonyl group.

2. A method for preparing 1-chloro-2-acyl-1-cyclohexenes which comprises condensing cyclohexanone with a carboxylic acid chloride having at least two carbon atoms, and not more than one carbonyl chloride group, in the presence of anhydrous aluminum chloride.

3. A method for preparing 1-chloro-2-acyl-1-cyclohexenes which comprises condensing cyclohexanone with a monocarboxylic acid chloride having at least two carbon atoms in the presence of anhydrous aluminum chloride.

4. A method for preparing 1-chloro-2-acyl-1-cyclohexenes which comprises condensing cyclohexanone with an aliphatic monocarboxylic acid chloride of two to eighteen carbon atoms in the presence of anhydrous aluminum chloride.

HERMAN A. BRUSON.
HARRY R. RATERINK.

REFERENCES CITED

The following references are of record in the file of this patent:

UNITED STATES PATENTS

| Number | Name | Date |
| --- | --- | --- |
| 1,967,862 | Carothers et al. | July 24, 1934 |
| 2,438,334 | Doumani et al. | Mar. 23, 1948 |

OTHER REFERENCES

Schwarzenbach et al., Helv. Chim. Acta, vol. 27, pages 1044–1060 (1944).

Allen et al., Can. J. Research, vol. 11, pages 382–394 (1934).

Hauser et al., J. Am. Chem. Soc., vol. 66, pages 345–349 (1944).

Gilman et al., J. Am. Chem. Soc., vol. 57, page 907 (1935).

Weiland et al., Berichte, vol. 55, page 2246 (1922).

Beilstein, "Organische Chemie," vol. VII, First Supplement, page 7, (1931).